MULTIPLEX COMMUNICATION TRANSMITTERS

Filed April 12, 1960

INVENTOR
Melbourne J. Hellstrom
BY Benjamin DeWitt
ATTORNEY

April 30, 1963 M. J. HELLSTROM 3,087,995

MULTIPLEX COMMUNICATION TRANSMITTERS

Filed April 12, 1960 3 Sheets-Sheet 2

April 30, 1963 M. J. HELLSTROM 3,087,995

MULTIPLEX COMMUNICATION TRANSMITTERS

Filed April 12, 1960 3 Sheets-Sheet 3

3,087,995
Patented Apr. 30, 1963

3,087,995

MULTIPLEX COMMUNICATION TRANSMITTERS

Melbourne John Hellstrom, Watchung, N.J., assignor to Westinghouse Electric Corporation, East Pittsburgh, Pa., a corporation of Pennsylvania Filed Apr. 12, 1960, Ser. No. 21,659
7 Claims. (Cl. 179—15)

The present invention relates generally to improvements in multiplex communication systems and more particularly to an improved transmitting apparatus for simultaneous transmission of two signals as separate modulations of a single carrier wave without undesirable interference between the two signals.

The present invention finds one particularly advantageous application in radio transmission of stereophonic sound signals. In ordinary radio systems, sound from a single microphone is transmitted over a single radio channel having a frequency bandwidth of about 9 to 10 kilocycles. In such systems, audio perspective is entirely lost since the amplitude differences, time delay and phase displacements of the sounds which would be received by the two ears of a listener located in the studio are not present in the single audio channel which feeds the transmitter.

Stereophonic transmission and reception has heretofore been demonstrated using two microphones set up at locations on each side of the stage on which an orchestra, for example, may be situated. In such demonstrations, each microphone is connected by a separate radio channel to one of two loudspeakers placed similarly as were the microphones, but in a remote listening chamber. By such previously demonstrated arrangements, an auditory effect may be obtained which is substantially the same as though the orchestra or other source of sound were actually located in a three dimensional array in front of the listener rather than the sound being reproduced by the loudspeakers.

In applying stereophonic sound concepts to radio communication, one very serious obstacle heretofore has been the necessity of using two separate channels for the transmission of the sound signals from the right hand and left hand microphones. That obstacle has heretofore prohibited commercial stereo transmission in the amplitude modulation broadcast band. To receive commercial acceptance, any AM broadcast band stereophonic transmission system must conform to the requirement that all signals outside a single frequency band of about 9 to 10 kilocycles bandwidth should, by international agreement, be attenuated so that signals transmitted in adjacent channels are not disturbed. Desirable solutions to the problem would permit transmission of both audio channels over the same carrier frequency, thereby using but one radio channel and reducing to a minimum the additional investment required at the transmitter as well as the additional investment required by listeners.

In copending U.S. patent application Serial No. 808,038, filed April 22, 1959, by H. E. Sweeney and C. W. Baugh, Jr., and assigned to the present assignee, there is described and claimed a stereophonic radio system meeting the foregoing requirements and enabling transmission of both audio signals on a single carrier wave within a standard AM broadcast channel of 10 kilocycles bandwidth. Briefly described, the system disclosed in the above copending application comprises circuit arrangements whereby the sum of the outputs of the two spaced microphones is transmitted as amplitude modulation and the difference of the outputs is transmitted as frequency modulation of the same carrier. Such transmission enables a conventional AM receiver, tuned to the transmitted carrier, to reproduce a sum signal $A+B$ which contains equally weighted components of the signal from each microphone and therefore represents balanced monophonic sound.

For stereophonic reception, the above-mentioned application provides a special receiver which requires only an amplitude limiter and a frequency detector in addition to the conventional circuits of a standard amplitude modulation broadcast band receiver. The $A+B$ signal from the conventional amplitude detector and the $A-B$ signal from the frequency detector are matrixed by known sum and difference producing circuits to individually reproduce the sound signals A and B. In such a stereophonic system, one particular problem of note arises: if it be considered, for the moment, that there is no amplitude modulation and only frequency modulation (as would occur when the sound signals A and B are substantially equal and out of phase), it is seen that the frequency selective circuits of a conventional receiver will modulate the amplitude of the received FM signal in accordance with the shape of its frequency response characteristic. More precisely, as the frequency modulated carrier signal sweeps across the conventional receiver pass band from one extreme of frequency deviation to the other, it will encounter variations in gain in accordance with the receiver pass band characteristic. Accordingly, the output of the frequency selective network of the receiver will be amplitude modulated as a function of the absolute frequency deviation of the carrier signal from its center frequency. This spurious amplitude modulation appears, in the signal applied to the amplitude detector, as frequency dependent amplitude distortion or "cross talk" of the frequency modulating signal into the amplitude modulation.

To overcome the foregoing FM to AM "cross talk" problem, the above-mentioned copending application provides circuitry for producing a distortion-precompensating signal which varies as a function of the frequency deviation of the frequency modulated carrier. The precompensation signal, according to that copending application, is additively combined with the monophonic sum signal ($A+B$), and the resultant predistorted audio signal is used to amplitude modulate the radio frequency carrier. The carrier wave is thereafter transmitted with the compatible monophonic sum signal being carried as amplitude modulation and with the stereophonic information ($A-B$) being transmitted as frequency modulation. In addition to the sum signal ($A+B$) audio information, the amplitude modulation includes a precompensation component which will substantially counteract the distortion expected to occur in a conventional amplitude modulation receiver.

The distortion precompensation system of the above-mentioned copending application provides fairly adequate compensation for the distortion occurring in ordinary AM receivers, and is highly advantageous over systems having no such precompensation. However, it does not result in exact precompensation. It is based on addition of the precompensation signal to the audio sum signal ($A+B$), while the distortion for which compensation is desired is actually a result of multiplication of the received carrier amplitude by the receiver IF bandpass response characteristic. Specifically, the transmitter apparatus of application Serial No. 808,038, produces a carrier amplitude modulation having the form:

$$[1+f(A+B)+g(A-B)] \qquad \text{I}$$

where $f(A+B)$ is the amplitude modulation component representative of the audio sum signal $A+B$, and $g(A-B)$ is the modulation component provided for precompensation.

The band-pass frequency selective circuit of an ordinary AM receiver when subjected to a carrier which is frequency modulated by a signal $(A-B)$ will have an amplitude modulating transfer characteristic of the form:

$$\frac{1}{1+g(A-B)} \qquad \text{II}$$

When a carrier modulated in amplitude in accordance with Formula I is applied to a receiver having the transfer characteristic of Formula II, the detected amplitude modulation envelope will be:

$$\frac{1+f(A+B)+g(A-B)}{1+g(A-B)} \qquad \text{III}$$

Only small values of $g(A-B)$ are encountered when the frequency deviation is limited to about 3 or 4 kilocycles. Accordingly, second order terms may be disregarded and the modulation envelope of Equation III is closely approximated by:

$$[1+f(A+B)+g(A-B)]\times[1-g(A-B)]$$

which expands to:

$$1+f(A+B)-f(A+B)g(A-B)-g^2(A-B)^2 \qquad \text{IV}$$

For complete compensation the resultant envelope as produced by the AM detector of the receiver should contain only audio sum signal components. Accordingly, the last two terms of Equation IV represent error or discrepancy between the desired precompensation and the actual precompensation produced by additive systems such as that of application Serial No. 808,038.

One of the concepts on which the present invention is based is perception that the additive precompensation technique, as taught by the above copending application, is mathematically inexact and hence can only provide approximate precompensation for the distortion produced by conventional AM receivers. I have recognized that such distortion is introduced by multiplication of the carrier amplitude in accordance with the receiver band-pass characteristic, and that exact precompensation can best be achieved, at the transmitting station, by multiplying the carrier wave amplitude by a precompensation factor which corresponds inversely to the band-pass response characteristic of the receiver. The circuits provided in accordance with my invention accomplish the foregoing by successive modulation in accordance with the audio sum signal and in accordance with a predetermined precompensation signal which varies as a function of carrier frequency deviation. Alternatively, in accordance with my invention the audio sum signal and the precompensation signal may be multiplied, and the resulting product may be used to amplitude modulate the carrier wave.

In either case, the carrier wave as radiated will have an amplitude envelope of the form:

$$M=[1+f(A+B)]\times[1+g(A-B)] \qquad \text{V}$$

When a radio frequency carrier having amplitude modulation in accordance with Equation V is passed through a conventional AM radio receiver having the transfer characteristic of Equation II, the resulting amplitude envelope will be:

$$[1+f(A+B)]\times[1+g(A-B)]\times\frac{1}{1+g(A-B)}=1+f(A+B) \qquad \text{(VI)}$$

The modulation represented by Equation VI when amplitude detected by the conventional AM detector of a standard receiver will produce an undistorted audio sum signal, $A+B$, corresponding to the monophonic portion of the transmitted program material. Accordingly, such receivers can compatibly reproduce the monophonic portion of the multiplex stereo signal transmitted by the system of my invention.

A primary object of the present invention is to provide an improved transmission system affording compatible reception of monophonic sound for listeners having conventional AM broadcast band receivers and simultaneously providing stereophonic sound reception for listeners having stereophonic receivers.

It is another object of the present invention to provide a multiplex communication system for more efficiently utilizing radio frequency channels wherein first and second signals respectively modulate a single carrier in amplitude and frequency respectively, and wherein predistortion of one of the modulations is provided to substantially compensate for distortions which would otherwise occur in the process of receiving and detecting said one modulation by means of a conventional receiver.

It is an additional object of the present invention to provide an improved system of communication wherein first and second signals are transmitted simultaneously by frequency modulation and by amplitude modulation respectively of a single carrier wave and wherein the amplitude modulation is modified before transmission by multiplication in accordance with a distortion compensating signal which corresponds inversely to the amplitude distortion expected to occur at the receiver as a result of application of the frequency modulated carrier to the non-linear response characteristic of the receiver, whereby conventional amplitude modulation receivers can monophonically reproduce said second signal without interference from the frequency modulation.

It is a further object of the present invention to provide, inter alia, a stereophonic transmitter apparatus for use in the standard AM broadcast band which apparatus may be constructed by addition of inexpensive auxiliary components to an existing broadcast band amplitude modulation transmitter.

Other general objects of the present invention are to provide improved stereophonic sound radio transmission systems, and to provide for compatible reception of monophonic sound by listeners who are not equipped with special stereophonic receiving equipment.

The foregoing and other objects and features of the present invention will be apparent from the following description taken with the accompanying drawing, throughout which like reference characters indicate like parts, which drawing forms a part of this application, and in which.

Figure 1:
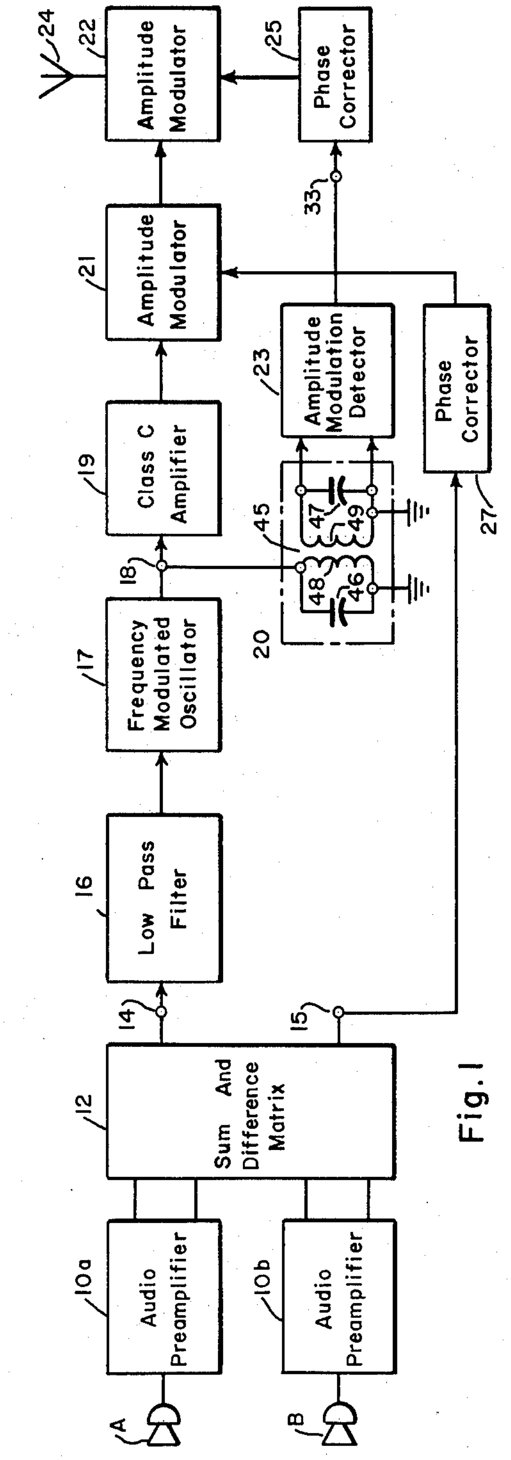
FIGURE 1 is a functional block diagram of a radio transmitter arranged in accordance with the present invention.

Referring now more specifically to FIGURE 1 of the drawings, microphones A and B are the two spaced microphones of the stereophonic system which microphones may be positioned in spaced relationship on the stage on which an orchestra or the like is located. The audio output signals of microphones A and B are applied to and amplified by audio preamplifiers 10$a$ and 10*b*, and the amplified audio signals are applied to first and second input circuits of a sum and difference producing matrix 12. Network 12 may comprise any one of the various known arrangements using resistance networks or phase inverters and amplifier circuits for producing a stereophonic difference signal, $A-B$, at output terminal 14, and a sum signal, $A+B$, at output terminal 15. The sum signal, $A+B$, corresponds to a balanced monophonic sound information such as would be transmitted in standard AM monophonic broadcast service. The difference signal $A-B$ as produced at terminal 14, includes information, such as phase differences and intensity differences between the signals received by the two microphones, which is necessary to provide the remote listener with intelligence as to sound directivity and other stereophonic effects.

The stereophonic difference signal $A-B$ from terminal 14 is applied to a low pass or bandpass filter network 16 connected in cascade between the source of difference signal and the input circuit of a frequency modulated oscillator 17. The purpose of the filter 16 is to limit the range of audio frequencies which are used to frequency modulate the oscillator 17. It has been found, by appropriate tests, that excellent stereophonic effect is achieved when audio frequencies above about 3000 cycles per second and below 300 cycles per second are present in the monophonic channel only and not in the stereophonic signal channel. Thus, very little improvement in stereo effect would be achieved by transmitting the signal below approximately 300 cycles or above 3000 cycles per second. In a preferred embodiment of the present invention, the band-pass filter 16 may comprise a conventional resistance capacitance filter network having a band pass characteristic extending from 300 cycles to 3000 cycles between the three decibel attenuation points. The filter cut off rate, outside the desired pass band, preferably should be approximately 6 decibels per octave. Alternatively, the filter may simply be low pass with cut-off at approximately 3000 cycles per second.

The frequency modulated oscillator 17, which has its input circuit connected to the output circuit of filter 16, may include a carrier wave generator or oscillator and a balanced modulator circuit, which circuits are known per se. Alternatively, the frequency modulated oscillator may comprise a carrier wave oscillator having an associated reactance tube for varying the frequency of the oscillator in accordance with the signal applied from band-pass filter 16. Oscillator circuit 17 is preferably designed to provide a frequency deviation of approximately 3 kilocycles maximum from the carrier center frequency $f_c$ in response to stereophonic difference signals from terminal 14. The output circuit of oscillator 17 is coupled, by way of terminal 18, to the input circuit of a class C power amplifier 19 and also to the input circuit of a notch filter network 20 which will be described in further detail hereinafter. The carrier signal channel of the transmitter comprises in addition to the class C amplifier 19, a first amplitude modulator 21 and a second amplitude modulator 22 connected in cascade relationship between the output circuit of amplifier 19 and a transmitting antenna 24. Individually, these components 19, 21 and 22 will be recognized as known components of conventional amplitude modulation transmitters which here serve to power amplify the frequency modulated carrier signal and to apply amplitude modulation intelligence thereto for radiation by the antenna 24. Since the amplifier 19 operates "class C" it will eliminate any casual amplitude modulation of the carrier signal and will provide at its output a frequency modulated carrier signal having a center frequency $f_c$ and having frequency deviations corresponding to the stereophonic intelligence signal $A-B$.

High power broadcast station transmitters of the type exemplified by the components 19, 21 and 22, do not, as a general rule, provide a flat frequency response characteristic. Accordingly, it is not desirable to amplitude modulate the carrier wave prior to power amplification of the same. The present invention overcomes that problem by amplifying the carrier wave to a high amplitude in amplifier 19 and thereafter modulating it successively with a monophonic sum signal $A+B$ applied to a second input circuit of amplitude modulator 21, and with a distortion precorrection signal applied to a second input circuit of amplitude modulator 22. Specifically, the monophonic sum signal $A+B$ is applied from the output terminal 15 of matrix 12 through a phase corrector 27 to the second input circuit of the amplitude modulator 21 and serves to modulate the amplitude of the carrier wave substantially in the same manner as audio signals are conventionally used to modulate the carrier signal in a conventional amplitude modulation broadcast transmitter. The phase corrector network 27 provides appropriate phase shift or delay of the monophonic sum signal $A+B$ so that the amplitude modulation of the carrier will have the proper time relationship to the stereophonic information frequency modulation of the carrier. Such phase correction is necessary to assure that the stereophonic signal components are maintained in proper time relationship to the $A+B$ signal so that the stereophonic and monophonic components may be reassembled after reception to provide a joint stereophonic effect. Correction of the phase of the sum signal $A+B$ at the transmitter is highly desirable to eliminate the need of providing such correction in each and every receiver which is adapted to produce both the stereophonic and monophonic signals.

Alternatively, and within the scope of the present invention, the order of modulation may be interchanged. That is, the precompensation signal from phase corrector 25 may be applied to the first modulator 21 and the monophonic signal, $A+B$, to the second modulator 22. Such a reverse sequence of modulation may be desirable, in some instances, to alleviate distortion which otherwise might be caused by the frequency response characteristics of the amplitude modulators.

Figure 4:
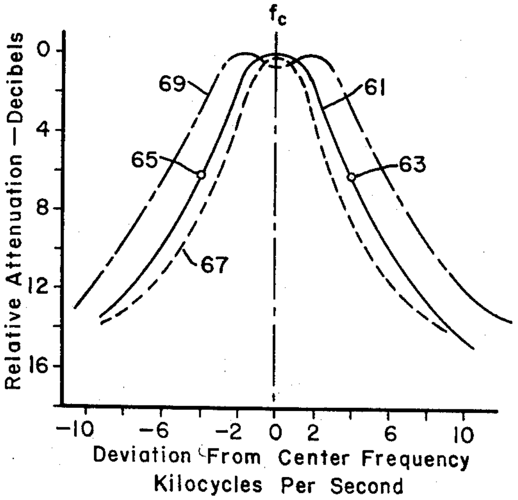
FIGURES 4 and 5 are graphs illustrating certain typical frequency response characteristics useful in explaining the various features of the present invention.

In FIG. 4, there is shown a plurality of curves illustrating the frequency response characteristics of conventional amplitude modulation receiving sets. Curve 61 represents the frequency response characteristic or band-pass characteristic of an average amplitude modulation receiving set having a bandwidth of approximately 8 kilocycles between the 6 decibel attenuation points 63 and 65. When a composite signal of the type produced by the circuit system of FIG. 1 is applied to a receiver having a band-pass characteristic as shown by curve 61, the frequency deviations which are a consequence of the frequency modulation cause the received carrier signal to sweep back and forth across the band-pass curve 61 at least part way between the points 63 and 65. Accordingly, the gain of the receiver is varied as a function of the frequency deviation and spurious amplitude modulation would be introduced and detected by the conventional AM detector circuit. The spurious amplitude modulation or distortion of the received signal by the receiver pass-band characteristic normally would result in cross talk of the frequency modulating signal $A-B$ into the amplitude modulating signal $A+B$ as it is reproduced by the amplitude modulation receiver.

The present invention compensates for the aforesaid distortion in the receiver by providing compensatory pre-distortion of the carrier wave amplitude modulation prior to transmission. As shown in FIGURE 1, such precompensation of the amplitude modulation is accomplished by means of the network including notch filter 20, amplitude detector 23 and phase corrector 25 connected in cascade between the output terminal of oscillator 18 and the second input circuit of amplitude modulator 22.

The notch filter network 20 comprises a double-tuned over-coupled radio frequency transformer 45 having a primary winding 48 shunted by a tuning capacitor 46 and having a secondary winding 49 shunted by a capacitor 47.

One end of the primary winding 48 is coupled to output terminal 18 of the frequency modulated oscillator 17. The other end of winding 48 is connected to ground or to a point of reference potential. One end of secondary winding 49 is connected to the same point of reference potential and the other end is coupled to the input circuit of the amplitude modulation detector 23. The notch filter network 20 has a band-pass characteristic substantially as shown by the curve 71 in FIG. 5.

As shown by curve 71, transformer 45 provides a frequency response characteristic which includes a re-entrant notch in its center portion, so that the frequency modulated carrier signal which is applied from terminal 18 across the primary winding 48, will be relatively more attenuated when its instantaneous frequency is near the center frequency $f_c$ than when near the points of maximum frequency deviation 73 and 75. The filter network 20 comprising the overcoupled double-tuned transformer 45 will be recognized as a structure known, per se, to those skilled in the art. Such networks are described in full in Terman, "Radio Engineers Handbook," Section 3, paragraph 9, first edition, 1943. The essential criteria for the notch filter network 20 in accordance with the present invention is that it have a frequency response characteristic substantially inversely corresponding to that of an average conventional AM receiver as exemplified by the curve 61 in FIG. 4.

The notch filter network 20, of FIGURE 1, responds to the frequency modulated radio frequency carrier applied to the input circuit thereof to produce at its output circuit a radio frequency signal which is amplitude modulated and frequency modulated with the amplitude being minimum when the frequency is near the carrier center frequency $f_c$ and with the amplitude approaching a maximum when the carrier frequency deviation is maximum. The amplitude modulation of the carrier signal as applied to detector circuit 23 is substantially in accordance with the function of curve 71 in FIG. 5 and inversely corresponds to the amplitude modulation which would be created in the frequency selective circuits of an ordinary AM receiver when receiving the frequency modulated signal produced by the apparatus of FIG. 1. The radio frequency carrier signal from notch filter network 20 is rectified or detected by the amplitude modulation detector 23 and a distortion precorrection signal is produced at the output thereof. The distortion precorrection signal includes audio frequency components and components corresponding to second harmonics of the stereophonic difference signal $A-B$. Essentially, the distortion precorrection signal varies as a function of the frequency deviations of the frequency modulated carrier signal and substantially in proportion to but in the opposite direction from the undesired amplitude modulation distortion which is expected to occur in a conventional AM receiver. At the skirt of the receiver passband for example, the distortion is greatest, hence the precorrection signal must also be greatest but in the opposite direction. The signal from detector 23 is applied by way of terminal 33 to the input circuit of phase corrector 25 which has its output circuit connected to the second input circuit of amplitude modulator 22. Phase corrector 25 serves to delay the precorrection signal so that maximum predistortion is provided in synchronism with the maximum frequency deviations of the frequency modulated carrier. The distortion precorrection signal, as applied to amplitude modulator 22, serves to additionally modulate the amplitude of the carrier wave so that the carrier wave as radiated by antenna 24 is precompensated for the aforementioned amplitude distortion which is expected to occur in conventional AM receivers.

By the successive amplitude modulation in accordance with the audio sum signal $A+B$ in amplitude modulator 21, and by the distortion precompensating signal in amplitude modulator 22, the carrier wave is in effect amplitude modulated in accordance with the product of the audio sum signal $A+B$ and the distortion precompensating signal. As stated heretofore, such product modulation of the carrier wave amplitude provides exact precompensation for the distortion which occurs when the multiplex carrier wave is selected and detected, by an AM receiver having a bandwidth of the order of eight kilocycles between the six decibel attenuation points.

Figure 2:
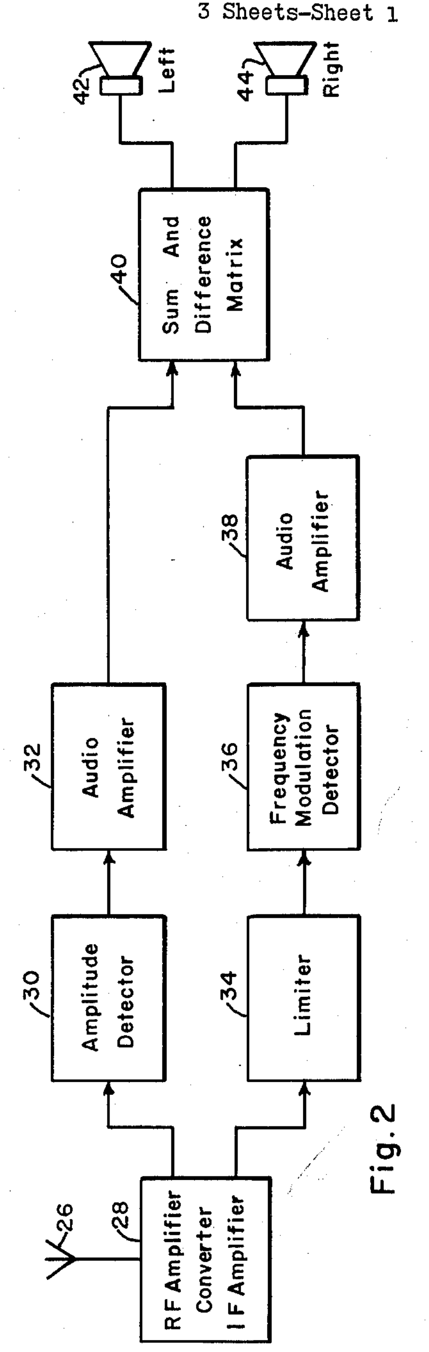
FIGURE 2 is a functional block diagram of a radio receiver arranged to receive and demodulate the signals transmitted by the transmitter of FIG. 1.

For the sake of completeness, there is shown in FIGURE 2 a dual channel AM, FM radio receiver which may be utilized to receive and reproduce the stereophonic FM and AM signal as transmitted by the apparatus of the present invention. It is to be understood that the present invention relates to the transmitter and to the method and means of precompensating the transmitted signal for distortion occurring in receivers of conventional bandwidth. The particular receiver system of FIG. 2 is shown by way of example only and is not considered a part of the present invention. Such receivers are more properly the subject matter of copending application Serial No. 808,038 and are described in greater detail therein.

Referring to FIGURE 2, the reference numeral 26 indicates a conventional receiving antenna for receiving signals transmitted by the apparatus of FIGURE 1. The signals are applied to a conventional heterodyne converter and intermediate frequency amplifier system denoted by block 28. The radio frequency signals are converted by converter-amplifier 28 to an intermediate frequency carrier signal having the same frequency modulation and amplitude modulation as the original signals. The intermediate frequency carrier signal is applied from block 28 to an amplitude detector 30 and also to an amplitude limiter 34 both of which are connected to the output circuit of the IF amplifier.

A first signal channel of the receiver includes conventional amplitude detector 30 and audio amplifier 32 for detecting the amplitude modulation signal $A+B$ and supplying that signal to a signal combining matrix 40. A second signal channel comprising limiter circuit 34, a frequency modulation detector 36, and audio amplifier 38 operates to detect the frequency modulation signal $A-B$ and apply it to a second input circuit of the matrix 40. Sum and difference matrixing networks of the type suitable for the block 40 of FIGURE 2 are known in the art and one such is described in detail in an article entitled "Single Push-Pull for Stereo Channels," published in Radio and Television News, issue of January 1959 on pages 48 and 49. It will be apparent to those skilled in the art that addition and subtraction of signals by means of transformer arrangements as shown in the above-mentioned article is not essential to the present invention. Other arrangements, known per se, utilizing resistance network and additive amplifier circuits may also be used in the system of the present invention. The signal combining network 40 has first and second output circuits connected respectively to first and second sound reproducing devices 42 and 44. Reproducing devices 42 and 44 are shown as comprising a pair of loudspeakers preferably spaced apart in a listening space such as a room of the listener's home.

The frequency modulation detector circuit 36 may comprise any of various well known frequency discriminator circuits such as, for example, a gated beam detector. The limiter 34 and the audio amplifier 38 will be recognized as components similar to those of conventional FM receivers. The only essential criterium for the second signal channel of the receiver is that the frequency modulation detector should be arranged to demodulate carrier signals of frequencies in the conventional IF band, normally about 456 kilocycles. An additional feature for the receiver of FIGURE 2 is that the response characteristic of the high frequency circuit 28 should be substantially similar to the curve 61 of FIGURE 4, and hence substantially similar to the response characteristic of ordinary AM receivers. Providing such a frequency response characteristic enables the high frequency circuits 28 to distort the received carrier amplitude modulation in substantially the same manner that such modulation is distorted by conventional amplitude modulation receivers. The amplitude modulation distortion occurring in the high frequency circuit 28 is thus substantially counteracted by the predistortion introduced at the transmitter by the distortion precorrection signal. Thus, the receiver of FIGURE 2 produces the audio sum signal $A+B$ at detector 30 without cross-talk from the frequency modulation. By introducing precompensating distortion at the transmitter, the use of economical circuits in the high frequency portion of the receiver is possible. Appreciable economy may be realized in the structure of the receiver in that it need not be provided with a flat frequency response characteristic but may use frequency selective components and circuits identical to those used in common broadcast band AM receivers.

Figure 3:
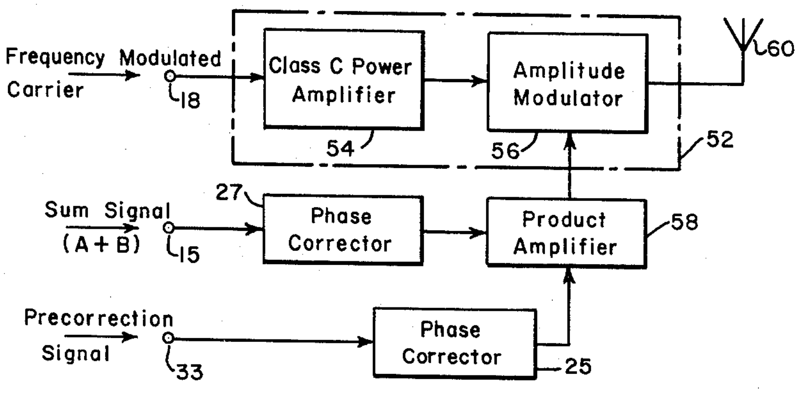
FIGURE 3 is a block diagram of a modification of a part of the radio transmitter in accordance with the invention.

Reference is now made specifically to FIGURE 3 of the accompanying drawing. FIGURE 3 illustrates, in partial form, a transmitter which is of the general character of that illustrated in FIGURE 1. It is to be understood that the terminals 18, 15 and 33 of the appartus of FIGURE 3 correspond to the same terminals of FIGURE 1 and might be connected respectively to the frequency modulated oscillator 17 of FIGURE 1 the sum signal output terminal 15 of matrix 12, and the precorrection signal detector 23 of FIG. 1. The transmitting apparatus of FIGURE 3 differs from that of FIGURE 1 in that the output of the frequency modulated oscillator 17 is applied by way of terminal 18 directly to the class C power amplifier 54 and therethrough to the amplitude modulator 56. It is to be noted that the apparatus of FIGURE 3 includes only a single amplitude modulator 56 whereas the apparatus of FIGURE 1 required a pair of cascade connected amplitude modulators 21 and 22. In FIGURE 3, the dotted block 52 designates the high power level section of the transmitter for applying power to antenna 60. Block 52 incorporates the usual class C power amplifier 54 and the usual amplitude modulator stage 56, with those components being substantially similar to those of a conventional AM transmitting station. Thus the expensive high power level components of the system of FIGURE 3 may be those which are already existent in commercial transmitting stations and the additional components of FIGURE 3 may be added to such a transmitting station without replacing or reconstructing any of the more expensive components.

The system of FIGURE 3 further differs from that of FIGURE 1 in that the sum signal from terminal 15 is applied through phase corrector 27 to a first input circuit of a product amplifier 58, and the distortion precorrection signal, as provided by detector 23 of FIG. 1, is applied through phase corrector 25 to a second input circuit of product amplifier 58. The output signal of product amplifier comprises the product of the monophonic audio signal (from corrector 27) and the distortion precorrection signal (from corrector 25) with each of the signals to be multiplied being provided with a suitable reference level by addition of a constant. Specifically, the product amplifier multiples $$1+f(A+B) \text{ by } 1+g(A-B)$$

to produce an output signal $$M=1+f(A+B)+g(A-B)+f_g(A^2-B^2)$$

Thus, the apparatus of the present invention multiplies the audio sum signal plus a constant by the precorrection signal plus a constant. Thus, it is specifically contrasted to the additive precompensation technique of copending application Serial No. 808,038.

Figure 6:
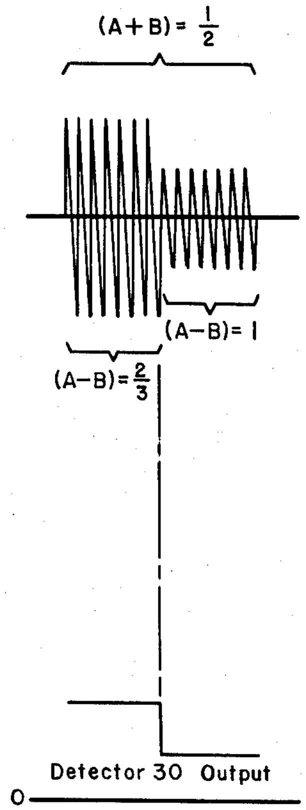
FIGURES 6 and 7 are voltage waveforms useful in explaining the advantage of the invention.
Figure 7:
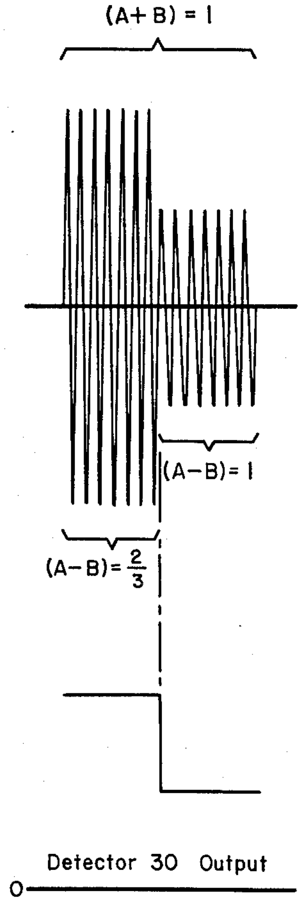

The comparative virtue of the modulation-by-product technique of the present invention can be understood most clearly by a non-mathematical consideration. Consider an example in which the frequency modulating signal changes from one fixed level to another fixed level, corresponding to say 2 kilocycles and 3 kilocycles deviation respectively. Without precompensation of any kind at the transmitter the RF signal presented to the receiver amplitude detector 30 will appear as in FIGURE 6 for a certain fixed level of $(A+B)$ and as shown in FIGURE 7 for twice that level of $(A+B)$. FIGURES 6($b$) and 7($b$), respectively, represent the output voltage of amplitude detector 30 when the radio frequency signals as shown by FIGURES 6($a$) and 7($a$) are applied thereto.

The height of the step in RF level, in FIGURES 6($a$) and 7($a$), is due only to the change frequency deviation from 2 kilocycles to 3 kilocycles. Thus, for the same differential change in the frequency modulating signal $(A-B)$, the absolute distortion occurring in the receiver increases as the magnitude of the amplitude modulating $(A+B)$ increases. The carrier amplitude of FIGURE 7 is greater than that of FIGURE 6. The absolute change in amplitude for a given frequency shift is greater in FIGURE 7 than in FIGURE 6.

In order to compensate for such a distortion at the transmitter it is necessary to increase the precompensaion when the instantaneous carrier envelope increases and conversely to decrease the precompensation when the instantaneous carrier envelope decreases. The presently disclosed modulation-by-product technique accomplishes this. The additive method of precompensation as disclosed by copending application Serial No. 808,038 does not accomplish the same result, because in that method the amount of precompensation is independent of the $(A+B)$ sum signal magnitude and is solely a function of the stereophonic difference signal $(A-B)$. In the method of the present invention, the precompensation is a function of both the sum signal $(A+B)$ and the difference signal $(A-B)$.

Now referring again to FIGURE 3, the output circuit of product amplifier 58 is connected to the control circuit or second input circuit of amplitude modulator 56 and is utilized to modulate the amplitude of the radiated carrier wave in accordance with the product of one plus the audio frequency sum signal $A+B$ and one plus the distortion precorrection signal.

The product amplifier 58 may be constructed in accordance with any one of a variety of known circuits which exhibit the characteristic of amplifying a first signal applied to one input circuit in proportion to the amplitude of a second signal applied to another input circuit. For example, product amplifier 58 may comprise a 6BN6 "gated beam" tube which is characterized by the fact that it will amplify a first signal fed to a first control electrode to an extent determined by the control potential of another electrode which serves as a second input circuit. If two varying signals are applied simultaneously to the respective control electrodes of such a tube, the instantaneous voltage amplitudes of the first signal will be amplified in proportion to the instantaneous values of the second signal, thereby producing an output signal which is proportional to the product of the first and second input signals. Various such product amplifier circuits are known, per se, in the art.

Figure 5:
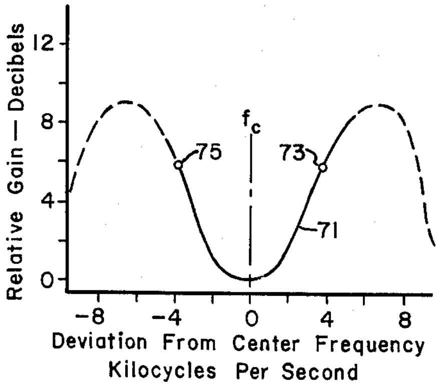

From inspection of curve 61 in FIGURE 4 and curve 71 in FIGURE 5, it will be appreciated that the distortion precompensation systems of the present invention provide predistortion of the amplitude modulation of the radio frequency carrier substantially corresponding inversely or oppositely to the distortion expected to occur in a conventional amplitude modulation receiver. That is, as the receiver compresses the signal due to the FM so does the transmitter expand it, the net result being no change. Such precompensation of the radiated signal enables greater carrier frequency deviation to be utilized without causing an objectionable amount of cross talk of the FM signal into the AM reception.

The frequency selective network of most conventional AM receivers exhibits approximately 8 kilocycles bandwidth between the 6 decibel attenuation points 63 and 65 as shown by curve 61 in FIG. 4. However, all amplitude modulation receivers do not have the same frequency response characteristic. Some have a slightly narrower frequency response as exemplified by curve 67. Others have an unusually wide frequency response characteristic as illustrated by curve 69 which indicates a bandwidth of approximately 12 kilocycles between the 6 decibel attenuation points. Accordingly, the transmitting apparatus of the present invention may not provide absolute precompensation for the distortion expected in all conventional amplitude modulation receivers now in existence. However, it will completely and exactly compensate for the distortion occurring in average amplitude modulation receivers, and will provide adequate compensation for the distortion occurring in the extremely wide band and extremely narrow band receivers as exemplified by curves 69 and 67. Thus, the apparatus of the present invention provides a stereophonic transmission system which may be operated within a conventional 10 kilocycle bandwidth in the AM broadcast band, conforming to the FCC regulations relative to radio broadcasting in the commercial broadcast band.

It will, of course, be appreciated that practically all conventional receivers have bandpass characteristics closely corresponding to the average bandwidth as shown by curve 61 and that the curves 67 and 69 exemplify extreme examples which would be encountered only on rare occasions. Consequently, the compensation provided by the transmission system of the present invention will be correspondingly better in most receivers. It will be noted that the precompensation provided by the system of the present invention not only reduces distortion in the output of an ordinary amplitude modulation receiver which is being used to listen monophonically, but also enables the use of standard components and economical circuits for the frequency selective portion of a stereophonic receiver such as that shown in FIGURE 2. The embodiment of the present invention as shown in FIGURE 3 is believed to be particularly advantageous in that it may be constructed by addition of auxiliary components to existing broadcast band amplitude modulation transmitting stations. Such a pre-existing transmitter may be converted to the system of the present invention simply by addition of the relatively inexpensive components necessary to frequency modulate the carrier and to provide the predistortion control voltage and multiplication of the same by the conventional audio modulating signal $1+f(A+B)$.

The dual-channel stereophonic receiver, illustrated herein at FIGURE 2 of the accompanying drawing, may correspond in circuit detail to the receiver of copending application Serial No. 808,037, filed April 22, 1959, entitled "Broadcast Stereo Receiver" which is assigned to the same assignee as that of the present invention. In general, any techniques there described for reception of the signals as transmitted by the systems of the present invention may be utilized in the receiver as disclosed by FIGURE 2 of the accompanying drawing.

While the present invention has been described with reference to first and second specific embodiments only, it will be obvious to those skilled in the art that it is not so limited but is susceptible of various changes and modifications without departing from the spirit and scope thereof.

I claim as my invention:

1. A multiplex communication system comprising means to generate a radio frequency carrier wave, means to frequency modulate said carrier wave in accordance with a first intelligence signal thereby creating frequency deviations corresponding to said signal, means to amplitude modulate said carrier wave in accordance with a second intelligence signal, said amplitude modulation means including means for effectively multiplying said second signal by a precorrection factor which varies as a function of said frequency deviations and substantially in proportion to and oppositely to the distortion expected to occur in a conventional broadcast receiver, whereby said second intelligence signal will be detectable in conventional receivers without substantial interference from the frequency modulation.

2. In a multiplex communications system, a source of intelligence-bearing first signal, a source of intelligence-bearing second signal, means responsive to said first signal for generating a frequency modulated carrier having a predetermined center frequency and frequency deviations continuously substantially proportional to said first signal, with said frequency deviations being of such magnitude that the amplitude-frequency response characteristic of a conventional broadcast band amplitude modulation receiver generates an undesired amplitude modulation distortion in response to the frequency modulation of said carrier, amplitude modulation means to provide amplitude modulation of the envelope of said carrier in accordance with said second signal, and means including a notch filter network responsive to said frequency deviations coupled to said amplitude modulation means to multiply said amplitude modulation by a distortion precorrection signal which varies as a function of said frequency deviations and substantially in proportion to and oppositely to said undesired amplitude modulation distortion, whereby said second signal will be reproducible in conventional amplitude modulation receivers without interference from said frequency modulation and said first signal will be reproducible in a frequency discriminating receiver tuned to said predetermined center frequency.

3. In a communications system a source of first modulation signal, a source of second modulation signal, means responsive to said first modulation signal for generating a frequency modulated carrier having a predetermined center frequency and frequency deviation continuously substantially proportional to said first modulation signal, means responsive to said second modulation signal for amplitude modulating said frequency modulated carrier in substantial proportion to said second modulation signal, means responsive to said frequency modulated carrier for generating a predistortion control signal which varies as a function of said frequency deviations, and means responsive to said predistortion control signal for further amplitude modulating to produce an output carrier wave having amplitude modulation substantially corresponding to the product of said second modulation signal and said predistortion control signal, with said carrier wave amplitude modulation being predistorted substantially in accordance with and opposite to the amplitude-frequency distortion expected to occur in a conventional amplitude modulation receiver, and means for transmitting said frequency and amplitude modulated carrier.

4. In a multiplex communications systems, a source of intelligence-bearing first signal, a source of intelligence-bearing second signal, means responsive to said first signal for generating a frequency modulated carrier having a predetermined center frequency and frequency deviation continuously substantially proportional to said first signal, with said frequency deviations extending over a frequency range which exceeds the linear amplitude-frequency response frequency range of the transfer characteristic of conventional broadcast band amplitude modulation receivers, means responsive to said carrier for generating a predistortion control voltage which varies continuously as a function of the carrier frequency deviation from said center frequency, means responsive to said second signal for amplitude modulating said carrier, and means responsive to said predistortion control voltage for further amplitude modulating said carrier substantially in accordance with and oppositely to the amplitude-frequency distortion expected at said receivers, whereby said second signal will be reproduced in conventional amplitude modulation receivers without cross talk from the frequency modulation.

5. Apparatus for stereophonic transmission of sound on a single carrier comprising first and second sound sources, means to add the outputs of said sources to obtain a sum signal, means to subtract the said outputs to obtain a difference signal, means for generating a carrier having a predetermined center frequency, mean for frequency modulating said carrier as a function of said difference signal, means responsive to the frequency modulated carrier for producing a distortion precorrection signal which varies as a function of the frequency deviation of said frequency modulated carrier from said center frequency, transmitter apparatus for radiating said carrier including means for continuously modulating the radiated carrier energy, and means for concurrently applying said sum signal and said correction signal to control said carrier energy modulating means so that the radiated carrier energy varies in accordance with the product of said sum signal plus a constant and said correction signal plus a constant and includes a precorrection amplitude modulation component opposite and complementary to the frequency-dependent amplitude distortion which will occur in a conventional amplitude modulation receiver responding to said radiated carrier energy.

6. In a stereophonic communication system wherein first and second sound signals are transmitted as separate modulations of a single carrier; transmitting apparatus comprising means for generating a carrier having a predetermined center frequency, means to modulate the frequency of said carrier in accordance with said first signal, means including a notch filter network responsive to the frequency modulated carrier for developing a control signal representative of the absolute difference between said center frequency and the instantaneous frequency of said modulated carrier, means for amplitude modulating said frequency modulated carrier in accordance with the product of said second signal and said control signal, and an antenna system for radiating the amplitude and frequency modulated carrier wave; receiving means comprising first and second channels having an amplitude modulation detector and a frequency modulation detector respectively, said amplitude modulation detector yielding said second signal and said frequency modulation detector yielding said first signal, said receiver means further including a frequency selective network with said amplitude modulation detector being coupled to the output of said selective network, said selective network having a non-linear frequency response characteristic over the range of frequency deviations of said modulated carrier, said notch filter network having a non-linear transfer characteristic substantially corresponding inversely to the response characteristic of said selective network over said range of frequency deviations, and means coupled to said detectors for separately reproducing said first and second sound signals.

7. In a multiplex communication system wherein first and second signals are transmitted and received respectively as frequency and amplitude modulations of a common carrier; transmitting apparatus comprising a source of sound representative signal A, a source of sound representative signal B, difference producing means for combining the signals A and B to produce a difference $A-B$, sum producing means for combining said signals A and B to produce a sum signal $A+B$, means responsive to said difference signal $A-B$ for generating a frequency modulated carrier having a predetermined center frequency and frequency deviations continuously varying substantially as a function of said difference signal, means including a notch filter network responsive to said frequency modulated carrier for producing a carrier wave having an amplitude modulation envelope which varies as a function of the absolute difference between said center frequency and the instantaneous frequency of said frequency modulated carrier, amplitude demodulation means coupled to said notch filter network and responsive to said carrier wave to produce a distortion precorrection signal which varies as a function of the frequency deviation of said frequency modulated carrier from said center frequency, circuit means coupled to said sum producing means and to said demodulation means for multiplying said sum signal $A+B$ by said distortion precorrection signal to produce a predistorted modulation signal corresponding to the product of said sum signal and said precorrection signal, amplitude modulation means coupled to said carrier generating means and responsive to said predistorted modulation signal for modulating the amplitude of said carrier, and means for transmitting said frequency and amplitude modulated carrier.

References Cited in the file of this patent

UNITED STATES PATENTS

| | | |
|---|---|---|
| 2,698,379 | Boelens et al. | Dec. 28, 1954 |
| 2,779,020 | Wilmotte | Jan. 22, 1957 |
| 2,851,532 | Crosby | Sept. 9, 1958 |